United States Patent Office.

WILLIAM H. LEWIS, OF BOSTON, MASSACHUSETTS, ASSIGNOR TO HIMSELF AND JOHN B. FOLGER, OF SAME PLACE.

Letters Patent No. 95,494, dated October 5, 1869.

IMPROVED MARINE PAINT.

The Schedule referred to in these Letters Patent and making part of the same.

To all whom it may concern:

Be it known that I, WILLIAM H. LEWIS, of Boston, in the county of Suffolk, and State of Massachusetts, have invented a new and improved Marine Paint; and I do hereby declare that the following is a full and exact description thereof.

The basis of my said improved marine paint is a solution of caoutchouc or gutta-percha, in tar-naphtha or other naphtha, which contains benzole and its congeners, and to this basis I add about twenty-five per cent. in volume of ground oxide of copper, and thoroughly incorporate the same into a homogeneous mass.

When required for use, my said improved marine paint may be reduced to the proper consistency by the incorporation therewith of the requisite quantity of tar-naphtha, or the chemical equivalent thereof.

Instead of the aforementioned ground oxide of copper, any other poisonous mineral substance which is slowly soluble in water containing alkaline chlorides in solution, may be employed in the production of my said improved marine paint.

What I claim as my invention, and desire to secure by Letters Patent, is—

The employment of a solution of caoutchouc or gutta-percha, in tar-naphtha, or other naphtha, containing benzole and its congeners, as a basis in the production of a marine paint.

Also, as a new manufacture, or composition of matter, an improved marine paint, composed of a solution of caoutchouc or gutta-percha, in tar-naphtha, or other naphtha, containing benzole and its congeners, in combination with oxide of copper, or other poisonous mineral substance, which is slowly soluble in water, containing alkaline chlorides in solution.

The aforegoing specification of my new composition or basis for an improved marine paint, signed and witnessed, this 8th day of June, 1868.

WILLIAM H. LEWIS.

Witnesses:
SAM. N. FISKE,
P. L. CLARKE.